(12) United States Patent
Nomura et al.

(10) Patent No.: US 6,642,308 B2
(45) Date of Patent: Nov. 4, 2003

(54) HIGH-DAMPING ELASTOMER COMPOSITION

(75) Inventors: Takeshi Nomura, Aichi-ken (JP); Kazunobu Hashimoto, Aichi-ken (JP)

(73) Assignee: Tokai Rubber Industries, Ltd., Komaki (JP)

( * ) Notice: Subject to any disclaimer, the term of this patent is extended or adjusted under 35 U.S.C. 154(b) by 106 days.

(21) Appl. No.: 09/805,181

(22) Filed: Mar. 14, 2001

(65) Prior Publication Data

US 2001/0039310 A1 Nov. 8, 2001

(30) Foreign Application Priority Data

Mar. 14, 2000 (JP) .......................................... 2000-070798

(51) Int. Cl.[7] .............................................. C08L 53/00
(52) U.S. Cl. .......................................... 525/93; 525/98
(58) Field of Search ...................... 525/93, 98

(56) References Cited

U.S. PATENT DOCUMENTS 5,723,543 A  *  3/1998  Modic

* cited by examiner

Primary Examiner—Jeffrey Mullis
(74) Attorney, Agent, or Firm—Armstrong, Westerman & Hattori LLP

(57) ABSTRACT

A high-damping elastomer composition comprises a styrene-isoprene-styrene triblock copolymer (component A) and a ethylene-methyl methacrylate random copolymer (component B). In the high-damping elastomer composition of the present invention, the styrene-isoprene-styrene triblock copolymer (component A) and the ethylene-methyl methacrylate random copolymer (component B) form a so-called "islands-in-the-sea" structure which may vary depending on the blending ratio therebetween. The components A and B are partially compatibilized with each other in a homogeneously mixed state in sea-island interfaces.

8 Claims, 1 Drawing Sheet

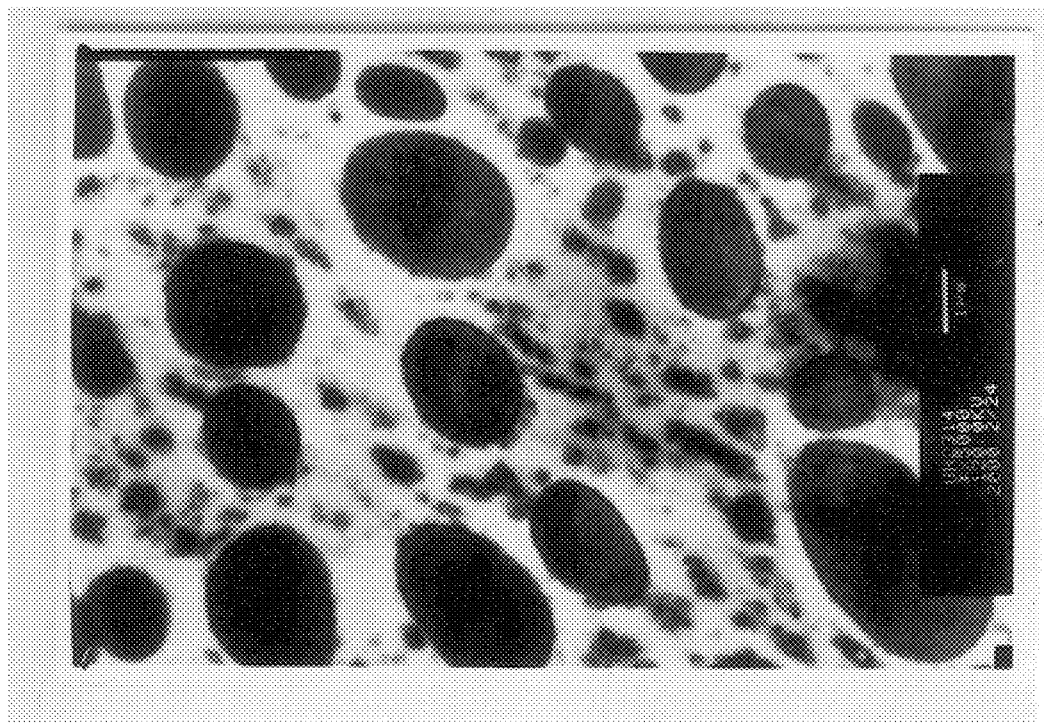

HIGH-DAMPING ELASTOMER COMPOSITION

BACKGROUND OF THE INVENTION

1. Field of the Invention

The present invention relates to a high-damping elastomer composition suitable for vibration absorbing materials, shock absorbing materials and the like and, more particularly, to a high-damping elastomer composition suitable for use in vibration damping and vibration isolating applications in the architectural field.

2. Description of the Art

In the architectural field, vibration dampers and vibration isolators are used for suppressing vibrations of buildings which may be caused by earthquakes, winds, heavy motor vehicles in traffic, and the like. Therefore, damping materials for use in such vibration dampers and vibration isolators are required to have a capability of absorbing small- to large-amplitude vibrations in accordance with the rigidity of a building. In order to ensure a stable damping effect in the architectural field, the damping materials are further required to have stable damping characteristics in an open air environment around the building, and desirably have less temperature-dependent damping characteristics and rigidity in the temperature range between 0° C. and 40° C. Typically employed as the damping materials for use in such applications is a rubber composition comprising a rubber as a main component, and a polymer having a higher glass transition temperature (Tg), a resin having a lower softening temperature, or a filler such as carbon black, calcium carbonate or mica.

However, the rigidity of the conventional rubber composition becomes more temperature-dependent, if an attempt is made to improve the damping characteristics thereof. More specifically, the rubber composition has a higher hardness and hence an excessively high rigidity at a low temperature, and has a lower hardness and hence an excessively low rigidity at a high temperature. Therefore, the rubber composition is disadvantageous in that the rigidity thereof is highly temperature-dependent.

In view of the foregoing, it is an object of the present invention to provide a high-damping elastomer composition which provides a high damping effect and has less temperature-dependent damping characteristics and rigidity.

SUMMARY OF THE INVENTION

To achieve the aforesaid object, the high-damping elastomer composition according to the present invention comprises:
(A) a styrene-isoprene-styrene triblock copolymer; and
(B) an ethylene-methyl methacrylate random copolymer.

A conventional approach to the improvement of the damping characteristics is to utilize the structural change of a matrix material at the glass transition temperature thereof. More specifically, the matrix material is designed so that the glass transition temperature thereof falls within a predetermined temperature range in which the damping material is required to provide the damping effect. Although this approach ensures a high damping effect, there are great variations in mechanical characteristics, such as damping characteristics and rigidity, of the damping material depending on the temperature because this approach utilizes the structural change of the matrix material from the glassy state to the rubbery state in the predetermined temperature range.

As a result of intensive studies, the inventors of the present invention have come up with an idea of providing a major damping effect by utilizing interactions in interfaces between matrix domains in a partially compatibilized blend while providing a temperature-dependent damping effect only in the predetermined temperature range by utilizing the structural change of the matrix material at the glass transition temperature. The inventors have further conducted research and development on the partially compatibilized system, and finally found that a styrene-isoprene-styrene triblock copolymer (component A) and an ethylene-methyl methacrylate random copolymer (component B) can be blended in a partially compatibilized state, thereby achieving the aforesaid object. Thus, the inventors have attained the present invention. More specifically, the styrene-isoprene-styrene triblock copolymer (component A) and the ethylene-methyl methacrylate random copolymer (component B) form a so-called "islands-in-the-sea" structure, which may vary depending on the blending ratio between the components A and B, in the inventive high-damping elastomer composition, and are partially compatibilized with each other in a homogeneously mixed state in sea-island interfaces. When a force is externally applied to the composition in a certain cycle, homogenization and segregation of the components A and B occur in the sea-island interfaces (in a macroscopic sense, assimilation and dissimilation of the components A and B occur in the see-island interfaces). At this time, the elastomer composition consumes the energy of the force, thereby providing a high damping effect. The elastomer composition, which is a partially compatibilized system, is free from substantial phase transition and, hence, has less temperature-dependent damping characteristics.

Where the blending ratio between the styrene-isoprene-styrene triblock copolymer (component A) and the ethylene-methyl methacrylate random copolymer (component B) is set to fall within a particular range, the partial compatibilization of the components A and B is promoted to further improve the damping characteristics of the elastomer composition.

Where the elastomer composition contains a tackifier in addition to the styrene-isoprene-styrene triblock copolymer (component A) and the ethylene-methyl methacrylate random copolymer (component B), the tackifier functions as an interphase controlling agent for partially compatibilizing the components A and B with each other, so that the partial compatibilization of the components A and B is further facilitated.

Where the elastomer composition contains a plasticizer in addition to the styrene-isoprene-styrene triblock copolymer (component A) and the ethylene-methyl methacrylate random copolymer (component B), the glass transition temperature (Tg) can be controlled as desired, so that the hardness and the temperature dependence of the elastomer composition can more easily be controlled.

BRIEF DESCRIPTION OF THE DRAWING

The sole FIGURE of the drawings is a photograph showing an exemplary partially compatibilized state of a high-damping elastomer composition of the present invention taken by a scanning electron microscope (×5,000).

DETAILED DESCRIPTION OF THE INVENTION

The present invention will hereinafter be described in detail by way of embodiments thereof.

The high-damping elastomer composition according to the present invention comprises a styrene-isoprene-styrene triblock copolymer (component A) and an ethylene-methyl methacrylate random copolymer (component B).

The styrene-isoprene-styrene triblock copolymer (component A) is a triblock copolymer which contains hard segments of styrene and soft segments of 1,4-isoprene.

The copolymerization ratio (weight ratio) between styrene and isoprene in the styrene-isoprene-styrene triblock copolymer (component A) is preferably styrene/isoprene= 10/90 to 60/40.

The styrene-isoprene-styrene triblock copolymer (component A) preferably has a number-average molecular weight of 100,000 to 300,000, particularly preferably 150,000 to 200,000.

The ethylene-methyl methacrylate random copolymer (component B) employed in combination with the styrene-isoprene-styrene triblock copolymer (component A) is a copolymer resulting from random copolymerization of ethylene (E) and methyl methacrylate (MMA).

The copolymerization ratio (weight ratio) between ethylene (E) and methyl methacrylate (MMA) is preferably E/MMA=95/5 to 60/40, particularly preferably E/MMA=90/10 to 70/30. If the copolymerization ratio of ethylene (E) is higher than 95 (or the copolymerization ratio of MMA is lower than 5), it is difficult to form a partially compatibilized system. If the copolymerization ratio of ethylene (E) is lower than 60 (or the copolymerization ratio of MMA is higher than 40), the resulting random copolymer is excessively polarized, thereby forming an incompatible system.

The ethylene-methyl methacrylate random copolymer (component B) preferably has a number-average molecular weight of 5,000 to 50,000, particularly preferably 20,000 to 40,000.

The proportion of the ethylene-methyl methacrylate random copolymer (component B) is preferably 10 to 60 parts by weight (hereinafter expressed simply as "part(s)"), particularly preferably 20 to 40 parts, based on 100 parts of the total of the components A and B. If the proportion of the component B falls outside the aforesaid range, it is difficult to partially compatibilize the components A and B with each other, so that the resulting elastomer composition tends to have degraded damping characteristics.

The high-damping elastomer composition of the present invention preferably contains a tackifier and a plasticizer in addition to the styrene-isoprene-styrene triblock copolymer (component A) and the ethylene-methyl methacrylate random copolymer (component B).

The tackifier to be employed in the present invention is not particularly limited, but preferable examples thereof include petroleum hydrocarbon resins, coumarone resins, rosin, rosin esters, phenol resins, ketone resins, dicyclopentadiene resins, maleate resins, epoxy resins, urea resins and melamine resins, which may be used either alone or in combination.

The proportion of the tackifier is preferably 5 to 70 parts, particularly preferably 20 to 60 parts, based on 100 parts of the total of the components A and B.

Examples of the plasticizer to be employed in the present invention include aroma oils, dioctyl phthalate (DOP) and paraffin oils.

The proportion of the plasticizer is preferably 5 to 60 parts, particularly preferably 20 to 50 parts, based on 100 parts of the total of the components A and B.

Along with the aforesaid components, a reinforcing material, a filler, a vulcanizer, a vulcanization accelerator, an oxidation inhibitor (anti-aging agent) and the like may be added to the high-damping elastomer composition of the present invention as required.

Examples of the reinforcing material include carbon black and silica. Examples of the filler include calcium carbonate, mica, graphite and magnesium oxide.

Examples of the vulcanizer include sulfur, organic peroxides and alkylphenol resins. Examples of the vulcanization accelerator include sulfenamide-based vulcanization accelerators, benzothiazole-based vulcanization accelerators and thiuram-based vulcanization accelerators.

Examples of the oxidation inhibitor (anti-aging agent) include dithiocarbamate-based oxidation inhibitors such as zinc dibutyldithiocarbamate, and phenol-based oxidation inhibitors.

The high-damping elastomer composition of the present invention can be prepared by mixing and kneading the aforesaid components by means of a mixing device such as a kneader, a planetary mixer or a mixing roll. The high-damping elastomer composition is heated at a temperature not lower than the melting point thereof. Then, the resulting melt is poured into a mold, and then allowed to stand for cooling thereof. Thus, the elastomer composition is molded into a product of a predetermined shape.

The high-damping elastomer composition of the present invention is suitable for use in vibration damping devices and vibration isolating devices such as vibration dampers and vibration damping walls for buildings in the architectural applications. The high-damping elastomer composition is also usable for vibration dampers for household electrical appliances, vibration dampers and vibration damping materials for electronic systems, vibration damping materials and shock absorbing materials for automobiles, and the like.

The high-damping elastomer composition of the present invention preferably has a loss tangent (tan $\delta$ of not smaller than 0.5, particularly preferably not smaller than 1.0. The loss tangent (tan $\delta$) is expressed as loss tangent (tan $\delta$)=loss modulus (E")/storage modulus (E'). It is known that, as the loss tangent (tan $\delta$) increases, a mechanical energy is more efficiently absorbed and released as an electric energy or a thermal energy for improvement of mechanical characteristics such as a sound absorbing characteristic and a vibration damping characteristic.

The temperature range in which the loss tangent of the high-damping elastomer composition of the present invention is maintained at tan $\delta$>0.5 is preferably 0° C. to 40° C. Where the elastomer composition has a loss tangent of tan $\delta$>0.5 in a wide temperature range, i.e., from 0° C. to 40°, the elastomer composition stably provides the damping effect at operating temperatures ranging from a relatively low temperature (0° C.) to a relatively high temperature (40° C.).

The ratio ($E'_{10}/E'_{30}$) of the storage modulus at 10° C. ($E'_{10}$) to the storage modulus at 30° C. ($E'_{30}$) of the high-damping elastomer composition of the present invention is preferably not higher than 2.5, particularly preferably not higher than 2.0. The ratio $E'_{10}/E'_{30}$ serves as an index of the temperature dependence of the rigidity. As the value of the ratio $E'_{10}/E'_{30}$ is closer to 1, the rigidity is less temperature-dependent.

Next, an explanation will be given to Examples and Comparative Examples.

Prior to the explanation of Examples and Comparative Examples, ingredients employed in these examples will be explained.

[SIS (Component A)]
Polystyrene/1,4-polyisoprene=15/85 (weight ratio) and a number-average molecular weight of 150,000 (SIS5405 available from JSR Co.)

[EMMA (Component B)]
E/MMA=75/25 (weight ratio) and a number-average molecular weight of 30,000 (ACRYFT WH501 available from Sumitomo Chemical Co., Ltd.)

[Tackifier]
Petroleum hydrocarbon resin (1) (ALCON P90 available from Arakawa Chemical Industries Ltd.)

[Tackifier]
Rosin ester (SUPER ESTER A100 available from Arakawa Chemical Industries Ltd.)

[Tackifier]
Petroleum hydrocarbon resin (2) (TACKIROLL 101 available from Sumitomo Chemical Co., Ltd.)

[Tackifier]
Terpene resin (YS RESIN T085 available from Yasuhara Chemical Co., Ltd.)

[Plasticizer]
Aroma oil (DIANA PROCESS NM300 available from Idemitsu Petrochemical Co., Ltd.)

[Oxidation Inhibitor]
Zinc dibutyldithiocarbamate represented by the following formula (NOCSELLER BZ-p available from Ouchi Shinko Kagaku K.K.):

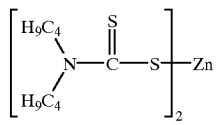

EXAMPLES 1 TO 12 AND COMPARATIVE EXAMPLES 1 AND 2

High-damping elastomer compositions were prepared by blending the ingredients in amounts indicated in Tables 1 to 3, and were each heat-pressed at 100° C. for 5 minutes to be formed into a sheet specimen (10 mm×10 mm square, 2-mm thickness). The loss tangent (tan δ) of the specimen was measured by a viscoelastic spectrometer (produced by Texas Instruments Incorporated) under the following conditions: a shearing strain of 50%; a frequency of 0.5 Hz; and measurement temperatures of 0° C. to 40° C. The results are shown in Tables 1 to 3. A tan δ peak value of not smaller than 0.5 indicates that the damping characteristic of the elastic composition is excellent.

The storage modulus at 10° C. ($E'_{10}$) and the storage modulus at 30° C. ($E'_{30}$) were determined, and the temperature dependence of the rigidity was evaluated on the basis of the ratio between these storage modulli ($E'_{10}/E'_{30}$). The results are shown in Tables 1 to 3. A ratio $E'_{10}/E'_{30}$ of not higher than 2.0 indicates that the rigidity of the elastic composition is less temperature-dependent.

TABLE 1

(Parts by weight)

| | Examples | | | | | |
|---|---|---|---|---|---|---|
| | 1 | 2 | 3 | 4 | 5 | 6 |
| SIS | 50 | 60 | 65 | 65 | 55 | 60 |
| EMMA | 50 | 40 | 35 | 35 | 45 | 40 |
| Petroleum hydrocarbon resin (1) | 30 | 30 | — | — | — | — |
| Rosin ester | — | — | — | 30 | — | — |
| Petroleum hydrocarbon resin (2) | — | — | 30 | — | — | — |
| Terpene resin | — | — | — | — | 30 | 30 |
| Plasticizer | 30 | 30 | 30 | 30 | 30 | 30 |
| Oxidation inhibitor | 3 | 3 | 3 | 3 | 3 | 3 |
| tan δ peak value | 0.81 | 0.75 | 0.73 | 0.69 | 0.80 | 0.76 |
| Peak temperature (° C.) | 40 | 40 | 40 | 40 | 40 | 40 |
| Temperature range (° C.) for tan δ >0.5 | 0–40 | 0–40 | 0–40 | 0–40 | 0–40 | 0–40 |
| $E'_{10}$ (dyn/cm$^2$) | $6.56 \times 10^5$ | $7.04 \times 10^5$ | $8.69 \times 10^5$ | $6.96 \times 10^5$ | $1.25 \times 10^6$ | $1.05 \times 10^6$ |
| $E'_{30}$ (dyn/cm$^2$) | $3.55 \times 10^5$ | $4.09 \times 10^5$ | $4.77 \times 10^5$ | $3.69 \times 10^5$ | $8.59 \times 10^5$ | $6.99 \times 10^5$ |
| $E'_{10}/E'_{30}$ | 1.85 | 1.72 | 1.82 | 1.89 | 1.46 | 1.51 |

TABLE 2

(Parts by weight)

| | Examples | | | | | |
|---|---|---|---|---|---|---|
| | 7 | 8 | 9 | 10 | 11 | 12 |
| SIS | 65 | 70 | 75 | 65 | 65 | 40 |
| EMMA | 35 | 30 | 25 | 35 | 35 | 60 |
| Petroleum hydrocarbon resin (1) | — | — | — | — | — | — |
| Rosin ester | — | — | — | — | — | — |
| Petroleum hydrocarbon resin (2) | — | — | — | — | — | — |
| Terpene resin | 30 | 30 | 30 | 50 | 70 | 30 |
| Plasticizer | 30 | 30 | 30 | 30 | 30 | 30 |
| Oxidation inhibitor | 3 | 3 | 3 | 1.5 | 1.5 | 1.5 |
| tan δ peak value | 0.75 | 0.71 | 0.63 | 0.76 | 0.83 | 0.91 |
| Peak temperature (° C.) | 40 | 40 | 40 | 40 | 40 | 40 |

TABLE 2-continued (Parts by weight)

| | Examples | | | | | |
|---|---|---|---|---|---|---|
| | 7 | 8 | 9 | 10 | 11 | 12 |
| Temperature range (° C.) for tan δ >0.5 | 0–40 | 0–40 | 0–40 | 0–40 | 0–40 | 0–40 |
| $E'_{10}$ (dyn/cm$^2$) | $6.47 \times 10^5$ | $6.01 \times 10^5$ | $5.13 \times 10^5$ | $6.24 \times 10^5$ | $5.32 \times 10^5$ | $1.32 \times 10^6$ |
| $E'_{30}$ (dyn/cm$^2$) | $3.80 \times 10^5$ | $3.66 \times 10^5$ | $2.77 \times 10^5$ | $3.23 \times 10^5$ | $2.66 \times 10^5$ | $8.49 \times 10^5$ |
| $E'_{10}/E'_{30}$ | 1.70 | 1.64 | 1.85 | 1.93 | 2.00 | 1.56 |

TABLE 3

(Parts by weight)

| | Comparative Examples | |
|---|---|---|
| | 1 | 2 |
| SIS | 100 | 50 |
| Natural rubber | — | 50 |
| EMMA | — | — |
| Petroleum hydrocarbon resin (1) | 75 | 75 |
| Rosin ester | — | — |
| Petroleum hydrocarbon resin (2) | — | — |
| Terpene resin | — | — |
| Plasticizer | 80 | 80 |
| Oxidation inhibitor | 3 | 3 |
| tan δ peak value | 0.38 | 0.52 |
| Peak temperature (° C.) | 0 | 0 |
| Temperature range (° C.) for tan δ >0.5 | — | 0–4 |
| $E'_{10}$ (dyn/cm$^2$) | $9.6 \times 10^5$ | $1.11 \times 10^6$ |
| $E'_{30}$ (dyn/cm$^2$) | $6.49 \times 10^5$ | $8.35 \times 10^5$ |
| $E'_{10}/E'_{30}$ | 1.48 | 1.33 |

As apparent from Tables 1 to 3, the elastomer compositions of Examples 1 to 12 each have a higher damping characteristic with a tan δ peak value of not lower than 0.5. In addition, the temperature range for tan δ>0.5 is wide, i.e., from 0° C. to 40° C., so that the damping characteristic is less temperature-dependent. Further, the ratio $E'_{10}/E'_{30}$ is not higher than 2.0, so that the rigidity is less temperature-dependent.

On the contrary, the elastomer composition of Comparative Example 1 which contains no EMMA has a significantly lower damping characteristic with a tan δ peak value of lower than 0.5. The elastomer composition of Comparative Example 2 which contains a natural rubber but no EMMA has tan δ>0.5 only in a very narrow temperature range, so that the damping characteristic is much more temperature-dependent.

The high-damping elastomer composition of Example 9 was inspected by means of a scanning electron microscope for observation of a partially compatibilized state thereof. As shown in FIGURE, a so-called "islands-in-the-sea" structure is formed by the SIS (component A) and the EMMA (component B) which constitute a sea domain and island domains, respectively, and the partially compatibilized state is observed in island-sea interfaces.

Subsequently, the high-damping elastomer composition of Example 7 was subjected to a vibration test for evaluation of the damping characteristics thereof under the following conditions. The vibration test was performed to evaluate the damping characteristics required for building materials. The results are shown in Table 4.

[Evaluation of Damping Characteristics by Vibration Test]

After a silicone frame of an open square shape was fastened between a pair of steel plates by screws, the high-damping elastomer composition of Example 7 was filled in the frame. In turn, the high-damping elastomer composition was heated in the frame at a temperature not lower than the melting point thereof. The resulting melt was solidified in adhesion contact with inner surfaces of the steel plates, and then the silicone frame was removed. Thus, a test specimen (10 mm×10 mm square, 6-mm thickness) was prepared. The test specimen was subjected to the vibration test under predetermined conditions with the use of a vibrator (available from Washimiya Seisakusho Co.), an input signal oscillator (synthesized function generator FG320 available from Yokokawa Electric Co., Ltd.) and an output signal processor (portable FFT analyzer available from Ono Measuring Instruments Co., Ltd.) for determination of the damping characteristics from the following equations (1) to (3) on the basis of strains in a vibration period and a load analysis.

Equivalent rigidity $(kN/m):Ke=Qd/\delta$     (1)

Equivalent damping coefficient $(kN \cdot sec/m):Ce=\Delta W/\pi\omega\delta^2$     (2)

Damping constant: $he=\Delta W/4\pi W$     (3)

Wherein $\omega=2\pi f$ (f: frequency (Hz)), $\Delta W$ is a load-strain loop area, and $W=Ke\ \delta^2/2$.

TABLE 4

| | 10° C. | | | 30° C. | | Temperature dependence (10° C./30° C.) | |
|---|---|---|---|---|---|---|---|
| Frequency (Hz) | 0.5 | 0.5 | 0.5 | 0.5 | 0.5 | 0.5 | 0.5 |
| Shearing strain (%) | 200 | 500 | 700 | 200 | 500 | 200 | 500 |
| Equivalent rigidity (kN/m) | 81.9 | 59.8 | 56.8 | 53.0 | 44.9 | 1.55 | 1.33 |
| Equivalent damping coefficient (kN · sec/m) | 21.7 | 12.5 | 9.68 | 14.6 | 8.48 | 1.49 | 1.47 |
| Damping constant | 0.42 | 0.33 | 0.27 | 0.43 | 0.30 | 0.98 | 1.1 |
| Tan δ | 0.77 | 0.91 | 0.86 | 0.90 | 0.84 | 0.86 | 1.08 |

Breaking extension was 1210%.
Separation and breakage of the matrix material were not observed at a shearing strain of 700%.

As can be seen from Table 4, the high-damping elastomer composition of Example 7 has damping characteristics satisfying the requirements for building materials.

As described above, the high-damping elastomer composition according to the present invention comprises the styrene-isoprene-styrene triblock copolymer (component A) and the ethylene-methyl methacrylate random copolymer (component B), which form a so-called "islands-in-the-sea" structure which may vary depending on the blending ratio therebetween. The components A and B are partially compatibilized with each other in a homogeneously mixed state in sea-island interfaces. When a force is externally applied to the composition in a certain cycle, homogenization and segregation of the components A and B occur in the sea-island interfaces (in a macroscopic sense, assimilation and dissimilation of the components A and B occur in the sea-island interfaces). At this time, the elastomer composition consumes the energy of the force, thereby providing a high damping effect. The elastomer composition, which is a partially compatibilized system, is free from substantial phase transition and, hence, has less temperature-dependent damping characteristics and rigidity.

Where the blending ratio between the styrene-isoprene-styrene triblock copolymer (component A) and the ethylene-methyl methacrylate random copolymer (component B) is set to fall within the particular range, the partial compatibilization of the components A and B is promoted to further improve the damping characteristics of the elastomer composition.

Where the elastomer composition contains the tackifier in addition to the styrene-isoprene-styrene triblock copolymer (component A) and the ethylene-methyl methacrylate random copolymer (component B), the tackifier functions as an interphase controlling agent for partially compatibilizing the components A and B with each other, so that the partial compatibilization of the components A and B is further facilitated.

Where the elastomer composition contains the plasticizer in addition to the styrene-isoprene-styrene triblock copolymer (component A) and the ethylene-methyl methacrylate random copolymer (component B), the glass transition temperature (Tg) can be controlled as desired, so that the hardness and the temperature dependence of the elastomer composition can more easily be controlled.

What is claimed is:

1. A elastomer composition comprising:
   (A) a styrene-isoprene-styrene triblock copolymer; and
   (B) an ethylene-methyl methacrylate random copolymer.

2. A elastomer composition as set forth in claim 1, wherein the component (B) is present in a proportion of 25 to 75 parts by weight based on 100 parts by weight of the total of the components (A) and (B).

3. A elastomer composition as set forth in claim 1, further comprising at least one tackifier selected from the group consisting of petroleum hydrocarbon resins, coumarone resins, rosin, rosin esters, phenol resins, ketone resins, dicyclopentadiene resins, maleate resins, epoxy resins, urea resins and melamine resins.

4. A elastomer composition as set forth in claim 2, further comprising at least one tackifier selected from the group consisting of petroleum hydrocarbon resins, coumarone resins, rosin, rosin esters, phenol resins, ketone resins, dicyclopentadiene resins, maleate resins, epoxy resins, urea resins and melamine resins.

5. A elastomer composition as set forth in claim 1, further comprising a plasticizer.

6. A elastomer composition as set forth in claim 2, further comprising a plasticizer.

7. A elastomer composition as set forth in claim 3, further comprising a plasticizer.

8. A elastomer composition as set forth in claim 4, further comprising a plasticizer.

* * * * *